July 16, 1963  K. A. HILL  3,097,426

TOOL FOR REDUCING THE DIAMETER OF A HOLE

Filed July 17, 1959

INVENTOR.
Keith A. Hill,
BY Parker & Carter
Attorneys.

United States Patent Office 3,097,426
Patented July 16, 1963

3,097,426
TOOL FOR REDUCING THE DIAMETER
OF A HOLE
Keith A. Hill, Rockton, Ill., assignor to Besly-Welles Corporation, South Beloit, Ill., a corporation of Illinois
Filed July 17, 1959, Ser. No. 827,942
13 Claims. (Cl. 29—567)

This invention is in the field of tools for varying the size of a cylindrical surface on a workpiece and is specifically concerned with reducing the diameter of a hole, although it might be applied to increasing the diameter of a shaft or the like.

A primary object of my invention is a tool for working the material of a hole inwardly without causing it to crumble.

Another object is a tool which will cause uniform inward metal flow with a minimum of torque.

Another object is a tool of the above type which will not bind.

Another object is a tool which will plastically deform the metal of a hole inwardly, or of a shaft outwardly, without chipping or crumbling.

Another object is a tool of the above type which may be used on holes that have worn differently and are different size due to different wear.

Another object is a tool that may be used on holes that have worn unevenly.

Another object is a tool of the above type which is intended primarily for use on the less ductile metals, for example cast iron.

Other objects will appear from time to time in the ensuing specification and drawings in which.

Figure 1:
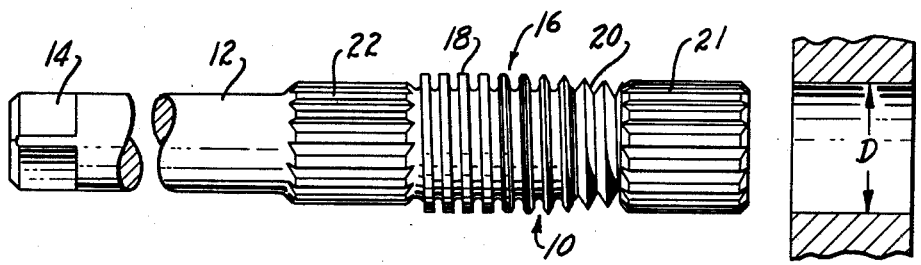
FIGURE 1 is a side view, partly in section, of a hole reducing tool according to my invention.

In FIGURE 1 the tool is indicated generally at 10 and includes a shank 12 which may be squared on its end as at 14 by milling, grinding or otherwise. The other end has a threaded working area 16 which is divided generally into a body section 18 and a tapered section 20, with a leading reamer section 21 adjacent section 20 and a finishing reamer section 22 adjacent section 18.

Figures 2, 3:
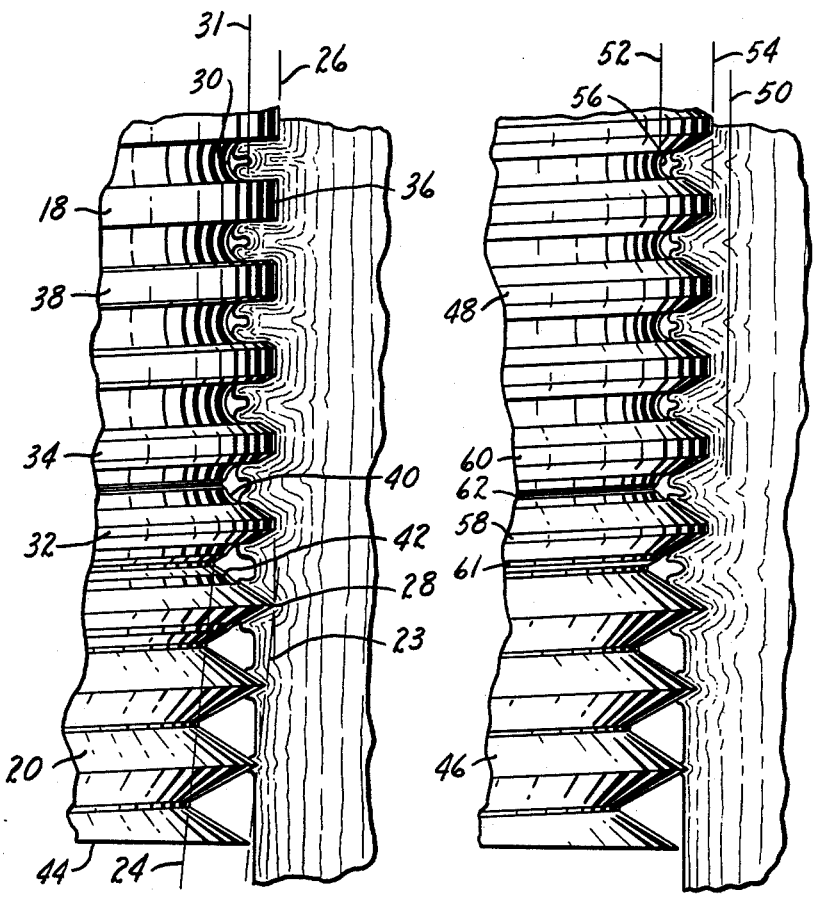
FIGURE 2 is an enlarged side view, partly in section, showing the tool in the hole.
FIGURE 3 is a side view, partly in section, similar to FIGURE 2, but of a variant form.

Considering the threaded area 16 first, as shown in FIGURE 2, the tapered section 20 is shown with uniform V threads disposed on a taper, all of constant thread depth. The crests of the threads are on an imaginary cone 23 with the roots on an imaginary corresponding cone 24. It will be noted that the crest, pitch and root diameters uniformly increase in the tapered section 20.

The body section 18 has the crests of the threads defined by a constant diameter 26 which intersects the crest cone 22 of the tapered section at approximately 28. The root areas of the threads in the body section are semi-circular, as indicated at 30, the centers of which are disposed on a constant diameter 31 until they disappear as the threads fall away in the tapered section 20.

In effect, the tapered section 20 continues along the crest and root cones 22 and 24 with a full depth thread and smooth V sides until it intersects the body section 18. The crest diameter 26 of the body section cuts off or removes the tops of the threads in the tapered section so that the root of each succeeding thread, from the intersection point 28 back toward the shank 12 of the tool, progressively widens. For example, the first such thread in FIGURE 2 above the intersection point 28 has a fairly well defined crest 32. The next has a wider crest 34, and so on until the V sides, which are a carry over from the tapered section, have completely disappeared and the thread is, in effect, square, as at 36, except for the semi-circular root. As the crests increase, the flanks diminish. Note that the flanks of the threads from the intersection point 28 to the square crest 36 progressively work their way toward the crest until only a small portion of the side shows on thread 38. The semi-circular root 30 of the body section intersects somewhat the V-shaped sides of the tapered section 20 at the thread adjacent the point of intersection, but the root of the V-shaped thread coming up from the tapered section 20 falls below the semi-circular root and a combination of the two is acquired, as shown at 40 and 42 in FIGURE 2. This has the advantage that the sides of the V-shaped thread are enlarged somewhat or removed to aid metal flow.

The purpose of this tool is to recondition the surface of a hole. Since holes will wear differently a number of conditions must be considered. The holes may be worn "out of round" or may be tapered or a combination of the two. The tool therefore must first correct the roundness of the hole in order that the extruding section 16 and reamer section 22 can act upon a uniform amount of material in the resizing operation.

I position a leading reamer 21, as shown in FIGURE 1, ahead of the threaded section 16, but an integral part of the tool. The diameter of the reamer 21 should be between the crest and pitch diameters of section 18 but preferably just slightly greater than pitch. Thus, regardless of the hole size, the leading reamer 21 will bring it to a diameter that the threaded section will work efficiently with. If the hole is oversize to begin with, the leading reamer 21 will have no effect and will not contact the walls of the hole. But if it is undersize, the reamer section will enlarge it.

The finishing reamer 22 may have a diameter anywhere between the crest and root diameters of the threaded section 18, but in any event, its diameter is the desired final hole diameter. Thus, when the material has been worked inwardly, as shown in FIGURES 2 and 3, the finishing reamer 22 will remove the excess metal and will bring the final operative diameter of the hole to the desired diameter. The tool shown in FIGURE 1 is intended to pass all the way through a workpiece and, accordingly, the shank 12 should be less than the diameter of the finishing reamer 22.

A tool of this type may be used to reduce or shrink a hole. For example, as shown in FIGURE 1 the tool is turned into a hole having a predetermined diameter D, which is the same as or a little greater than the pitch diameter of the body section 18. Or the leading reamer 21 will have made it that diameter. The first turn or so, as at 44, or the tapered section 20, is less than the diameter D of the hole. When the tool is turned, material will flow toward the root. The tapered section does the initial work and, in effect, bites or takes hold of the workpiece. The action of the metal flowing into the roots of the threads is shown in FIGURE 2. The gouged out or removed sides of the threads, as at 40 and 42 in the overlapping zone, provide a cavity into which the material can flow. At the same time, the crests of the threads from the intersecting point 28 back toward the shank are enlarged, which provides an additional force for driving the metal into the root. At the same time, the root enlarges until a full semi-circular deep root is provided, as at 30. Along with this, the crest becomes more square to exert additional pressure on the metal. It will be noted, for example, that the material adjacent thread 36 has worked its way a substantial distance inwardly from the original diameter D of the hole.

In the variant form shown in FIGURE 3, the tapered section 46 may be the same but the body section 48 differs in the following respect. The threads of the body section are essentially or basically V threads having imaginary constant crest and root diameters 50 and 52. However, the crests of the threads are removed or relieved a predetermined amount, as at 54, and the root areas are enlarged into a semi-circular root cavity 56. At the same time, the sides of the threads in the body section 48 continue their basic V form, the difference being that the crest is relieved or removed and the root is enlarged. One or two threads, as at 58 and 60, may be the overlap or junction point and it will be noted that the enlarging of the roots for the body section, as at 56, causes a slight enlargening or removal of material from the side or flank of intermediate thread 58, as at 61. At the same time, the V root from the tapered section carries over somewhat into the next root, as at 62. But, thereafter, in the body section the root is smooth and well rounded.

The use, operation and function of my invention are as follows:

In many situations it is highly desirable to reduce the size of a hole. For example, the hole may become worn in use or it may be oversize to begin with. To be able to reduce the hole size means that the part does not have to be thrown away but may be reworked and reused.

This is also true of outside surfaces, such as shafts, tubes, etc. And while I have shown basically a tap type tool for use with holes, the subject matter could be equally well applied to a die or the like.

Tools of this type had been in use before but they have never successfully been used with materials which have a tendency to crumble when worked excessively, for example cast iron and the less ductile metals. My tool has a tapered working section which starts the inward flow of the metal. This is followed by a body section which has a more or less constant diameter but at the same time is provided with an enlarged or deepened root cavity so that the material can more freely flow inwardly. The tool will have little if any tendency to bind and the torque will be quite low.

At the same time I prefer that the thread formation, both on the body section and on the tapered working section, be provided with a plurality of radial reliefs, such as shown in U.S. Patent 2,807,813, issued October 1, 1957. It is important that in all cases the thread be continuous and that no cutting edges be formed by relieved flutes or otherwise. The thread, at all points, has a constant thread depth and is unbroken. I might provide longitudinal channels in the radial reliefs to insure lubricant flow. But this involves longitudinally milling or grinding a slot in the threads which I prefer to avoid in most cases.

The FIGURE 2 form has the advantage that the crests of the threads in the body section uniformly and progressively enlarge and additional force is exerted to drive the material into the enlarged root. A tool of the type shown in FIGURE 2 may be made by grinding the V threads on the tapered section and then grinding the deep wide root threads on the body section. Radial reliefs, such as in U.S. Patent No. 2,807,813, may be applied at the same time.

In the FIGURE 3 form the tapered section may be first applied. Then the same threads, but on a greater diameter, may be applied to the body section. Thereafter, the roots may be enlarged by a suitable grinding wheel down to the root diameter desired leaving the crests somewhat broad and flattened.

In all cases I have shown a V thread on the tapered section but it might vary somewhat. The same is true of the wide root cavity on the body section. I have shown it as semi-circular but it might be more square or elliptical, for example. The important point is that it should be enlarged so that the root does not resist the inward flow of material.

The leading and finishing reamers are an integral part of the tool and, in this case, the tool is intended to pass completely through the work. I prefer that the diameter of the leading reamer be slightly greater than the pitch diameter of the body section with the diameter of the finishing reamer at the final desired diameter of the hole.

While I have shown and described the preferred form and one variation of my invention and suggested other variations, it should be understood that suitable additional modifications, changes, substitutions and alterations may be made without departing from the invention's fundamental theme. I, therefore, wish that the invention be unrestricted except as by the appended claims.

I claim:

1. A tool for changing the size of a cylindrical surface on a metal workpiece including a threaded body section having a constant thread depth and predetermined root, pitch and crest diameters, and a threaded metal working tapered section adjacent and leading to the body section having predetermined gradually varying root, pitch and crest diameters, the threads on the body section being a uniform continuation of the threads on the tapered section, the cross sectional area, taken in an axial plane, of the root space between the pitch and root diameters and between adjacent threads of the body section being greater than the corresponding cross sectional area on the tapered section.

2. The structure of claim 1 further characterized in that the cross sectional area of the thread crest between the crest and pitch circles of the body section is greater than the corresponding cross sectional area on the tapered section.

3. The structure of claim 1 further characterized in that the root space between adjacent threads of the body section is semi-circular.

4. A tool for reducing the size of a hole in a metal workpiece including a shank with a threaded body section and threaded metal working tapered section adjacent and leading up to the body section, the root area between the threads in the body section being greater than the corresponding area in the tapered section with the threads on one a uniform continuation of the other.

5. The structure of claim 4 further characterized in that the crest area of the threads in the body section is greater than the corresponding area in the tapered section.

6. The structure of claim 4 further characterized in that the root area between adjacent threads of the body section is semi-circular.

7. The structure of claim 4 further characterized in that the thread is continuous and uninterrupted and the sections are formed with a series of successive radially relieved sectors circumferentially thereof.

8. The structure of claim 7 further characterized in that the radially relieved sectors are axially aligned.

9. A tool for reducing the size of a hole in a workpiece including a shank with a threaded body section having a constant thread depth and predetermined root, pitch and crest diameters, and a threaded metal working tapered section adjacent and leading up to the body section having predetermined gradually increasing root, pitch and crest diameters, the crest of the threads in the body section being uniformly relieved and the root area being uniformly deepened and widened, the threads in the body section otherwise conforming to the character of the threads in the tapered section.

10. The structure of claim 9 further characterized in that the root areas of the threads in the body section, when taken in axial cross section, are semi-circular.

11. A tool for reducing the size of a hole in a metal workpiece including a shank with a threaded body section and a threaded metal working tapered section adjacent, leading up to, and merging into the body section, the threads of the body section having predetermined gradually increasing root, pitch and crest diameters, the threads of the body section being formed as an increasing continuation of the threads in the tapered section with the crests thereof uniformly relieved to a predetermined constant maximum diameter and the root areas enlarged at a predetermined diameter and according to a predetermined pattern.

12. A tool for reducing the size of a hole in a metal workpiece including a threaded body section and threaded tapered section axially aligned with each other, and a leading reamer section ahead of the tapered section having a diameter between the pitch and crest diameters of the body section.

13. The structure of claim 12 further characterized by and including a finishing reamer section behind the body section having a diameter between the crest and root diameters of the body section.

References Cited in the file of this patent

UNITED STATES PATENTS

| | | |
|---|---|---|
| 832,076 | Oster | Oct. 2, 1906 |
| 1,475,561 | Bath | Nov. 27, 1923 |
| 1,725,233 | Walker | Aug. 20, 1929 |
| 1,865,575 | Locke | July 5, 1932 |
| 2,116,036 | Money | May 3, 1938 |
| 2,757,392 | Petersen | Aug. 7, 1956 |
| 2,807,813 | Welles | Oct. 1, 1957 |

FOREIGN PATENTS

| | | |
|---|---|---|
| 1,185,915 | France | Feb. 16, 1959 |